United States Patent [19]

Adams et al.

[11] Patent Number: 5,446,602

[45] Date of Patent: Aug. 29, 1995

[54] TAPE MEDIA FORMATTED TO INCLUDE MULTIPLE, SPACED APART SYSTEM ZONES EACH FOR STORING VOLUME FORMAT INFORMATION

[75] Inventors: Stephen M. Adams, Sachse, Tex.; Lionel C. Shih, San Jose, Calif.

[73] Assignees: E-Systems, Inc., Dallas, Tex.; Ampex Corporation, Redwood City, Calif.

[21] Appl. No.: 843,533

[22] Filed: Feb. 28, 1992

[51] Int. Cl.[6] .................................................. G11B 5/09
[52] U.S. Cl. ....................................... 360/48; 360/49; 360/72.1; 360/72.2
[58] Field of Search .................. 360/48, 49, 72.1, 72.2; 395/425, 600; 369/275.3

[56] References Cited

U.S. PATENT DOCUMENTS

| | | | |
|---|---|---|---|
| 3,986,208 | 10/1976 | Sykes | 360/49 |
| 4,321,632 | 3/1982 | Leis et al. | 360/49 |
| 4,622,600 | 11/1986 | Okamoto et al. | 360/32 |
| 4,663,678 | 5/1987 | Blum | 360/72.2 |
| 4,926,272 | 5/1990 | Takamatsu et al. | 360/49 |
| 4,935,824 | 6/1990 | Nakano et al. | 360/48 |

FOREIGN PATENT DOCUMENTS

| | | |
|---|---|---|
| 324542 | 7/1989 | European Pat. Off. . |
| 420727 | 6/1991 | European Pat. Off. . |
| 459041 | 12/1991 | European Pat. Off. . |

OTHER PUBLICATIONS

K. Lion, "DATA/DAT Format Provides Random Access Tape Option", Computer Technology Review, vol. 9, No. 14, Nov. 1989.

Hewlett-Packard Company/Sony Corporation, "Digital Data Storage Format Description"; Revision B, Oct., 1988, pp. 2–7, 2–8, 3–3 and 4–1.

Primary Examiner—Paul V. Kulik
Attorney, Agent, or Firm—Harold E. Meier

[57] ABSTRACT

There is described an information area of a system zone and a method for formatting a length of magnetic tape with a plurality of information areas containing volume format information for the entire tape volume. The information area contains an area for storing volume format parameters and an area for storing a volume format table generated from the volume format parameters.

8 Claims, 3 Drawing Sheets

VOLUME FORMAT TABLE

| FIELD NAME | FIELD SIZE (IN BYTES) | COMMENTS |
|---|---|---|
| NVTE | 2 | NUMBER OF VALID ENTRIES IN VOLUME FORMAT TABLE |
| TABLE ENTRIES | N*8 | UP TO 1,124 SECTION ENTRIES PLUS ONE EOV ENTRY |
| VFTCS | 2 | VOLUME FORMAT TABLE CHECKSUM |

Fig.3

TAPE MEDIA FORMATTED TO INCLUDE MULTIPLE, SPACED APART SYSTEM ZONES EACH FOR STORING VOLUME FORMAT INFORMATION

TECHNICAL FIELD

This invention relates to formatting of a recording tape, and more specifically to formatting a plurality of areas on the magnetic tape containing volume format information.

BACKGROUND OF THE INVENTION

In the past, the loading and unloading of magnetic tapes has always occurred at system zones located at the beginning of a tape. The Beginning of Tape [BOT] loading zones reflected a desire to avoid loading or unloading the tape over recorded data, thereby avoiding potential loss of data in the event the tape was temporarily stretched or permanently damaged during loading or unloading operations. Also, there was a desire to avoid recording over previous load/unload areas, due to the belief that the area was rendered unreliable for subsequent recording and reproducing at the desired level of system performance. BOT system zones and format arrangements create several problems.

Since there is only a single area at the beginning of the tape for mechanical operations, the tape has to be completely rewound to the beginning to allow loading and unloading of the tape. This requires additional time and effort on the part of the user. Additional problems are introduced with the use of rotating scanner contact recording for computer peripherals. One problem is the wear caused by the scanner during indefinite wait periods, sometimes called "still-framing" where rotating scanner contact recording is used in a video application. Another problem is the potential damage from thread and unthread of media from the rotating scanner. One prior method forced air between the scanner head and a magnetic media to reduce contact while the thread media was not in motion. The mechanisms required to supply the volume of forced air required to achieve lift of the tape adds greatly to the manufacturing and maintenance costs of the peripheral recording device. Moreover, this method does not ensure media safety for thread and unthread operations, since uneven tensions on the tape during these operations can reduce the effectiveness of the forced air in separating the scanner head and the media. Thread and unthread away from BOT is thus at an increased risk to data storage.

A further problem arising with system zones presently used is that they lack support for information regarding the use of variable partitioning in tape formatting. Thus, there is no way for the host to determine volume formatting from the system zone itself. Additional systems are required to supply information or instruction of the peripheral recording device in regard to partition size and location. These systems create additional expense and complexity beyond the traditional costs associated with interchange media for computer systems. Since this information also is not present away from beginning-of-tape, current methods limit the ability to complete the loading of a variable formatted medium away from beginning-of-tape. Returning to beginning-of-tape requires additional time and effort on the part of the user, as well as wear on the peripheral recording device and the media itself.

Thus, a need has arisen for a method of formatting multiple system zones on a magnetic tape such that the system zones contain volume formatting information and allow for non-BOT mechanical operations of the magnetic tape.

SUMMARY OF THE INVENTION

The present invention overcomes the foregoing and other problems associated with the prior art by formatting multiple system zones capable of mechanical operations throughout the length of a magnetic tape and by recording in each system zone volume format information.

The system zone is comprised of two areas. The first is the load operation zone [LOZ]. The LOZ is the area used for mechanical operations of the tape including loading and unloading of the magnetic tape and threading and unthreading of the magnetic tape from the scanner head of a peripheral recording device.

The second area of the system zone is the Volume Format Information [VFI]. This area is a duplicate of the volume format information existing at the beginning of the tape and contains information on the data volume format that allows retrieval of volume identifier and format information from any system zone on the tape. The VFI normally consists of a set of volume format parameters and a volume format table generated from the parameters.

A controller of a peripheral recording device prompts a host computer system to instruct the recording device to format a tape with selectively spaced multiple system zones as designated by the host throughout the tape length. The controller also requests the volume format parameters that are stored in the VFI zone. Once all of the system zones are formatted onto the tape, mechanical operations may occur at any system zone and information on the entire tape volume format may be retrieved from any system zone area.

BRIEF DESCRIPTION OF THE DRAWINGS

For a more complete understanding of the present invention and the advantages thereof, reference is now made to the following detailed description taken in conjunction with the accompanying drawings in which:

FIG. 3 is a diagram of a volume format table; and

DETAILED DESCRIPTION OF THE INVENTION

Figure 1:
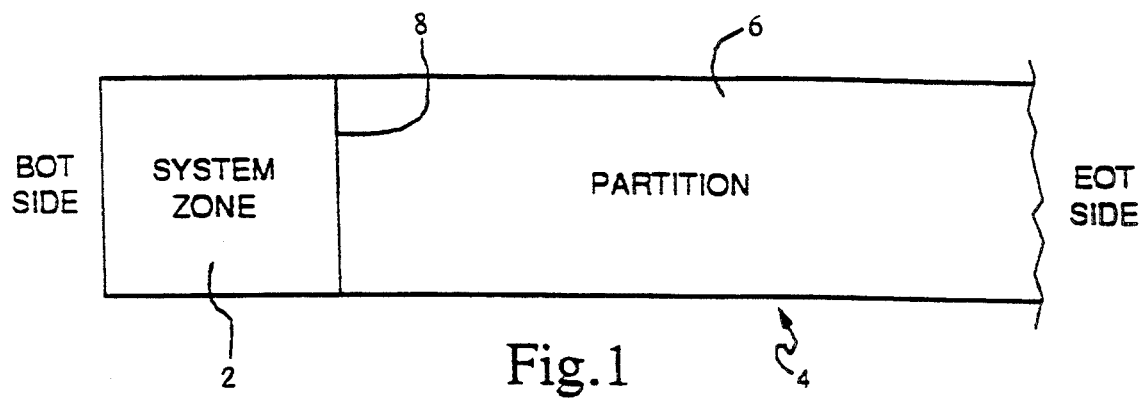
FIG. 1 is a diagram of the prior art method for volume formatting.

Referring now to the drawings, and more particularly to FIG. 1 wherein there is shown an illustration of the prior art formatting of the length of a magnetic tape for data storage. Under prior methods, a single system zone 2 is placed at the beginning of a magnetic tape 4. This zone contains the information necessary for system use during loading and threading operations. The system zone 2 is immediately followed by a single partition 6 starting at the beginning of media (BOM) and continuing until the End-of-Media Warning (EMW). The area for user data storage begins at the partition boundary 8.

In the present invention, at the beginning of the format procedure, a controller instructs a peripheral recording device to prompt a host computer system for the desired number of system zones and for the tape length interval between the system zones. System zones are fixed-length areas on tape, occurring at regular intervals, which are reserved for system use. The system zones are formatted onto the magnetic tape by the peripheral recording device as indicated by the responses of the host computer system. Once the plurality of system zones have been formatted onto the tape, system loading and threading operations may be carried out at any of the system zones. The peripheral recording device and the host computer system are conventional hardware and do not form a part of the present invention.

Figure 2:
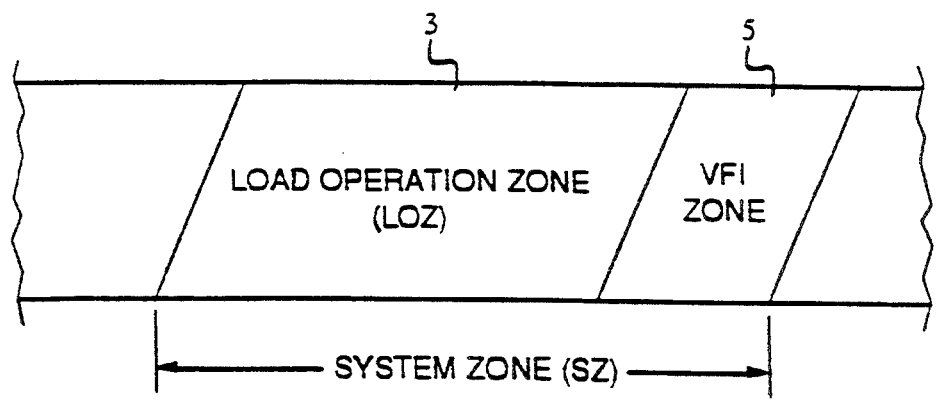
FIG. 2 is a diagram of the format of a system zone on a magnetic tape.

The format of a system zone is illustrated in FIG. 2. The system zone is comprised of two areas. The Load Operation Zone (LOZ) 3 is used for mechanical operations on the tape. The Volume Format Information Zone (VFI) 5 is an area containing information on the data volume format. This information allows the peripheral recording device to locate any partition on the magnetic tape.

Mechanical operations performed at the load operation zone include the loading and unloading of magnetic tapes and sometimes may also or alternatively include threading and unthreading of the tape from the scanner head of the peripheral recording device. Limiting mechanical operations to this areas of a system zone prevents the possibility that data may be recorded in an area of the tape that has been damaged or stretched due to the mechanical operations.

The VFI zones are areas dedicated to providing volume format related information. The volume format information is provided in two forms: the Volume Format Information [VFI] and the Volume Format Table [VFT].

The VFI consists of thirteen parameters relating to information on the entire volume format. These parameters are designated by the host computer system in response to queries by controlling software. One of these parameters, a Volume Identifier [VLID], is a field used to record the assigned name of a volume of tape in ASCII format. When the field is not in use, it will contain six null characters in ASCII format. All VLID fields in a tape format may contain the same information.

Another parameter, a System Zone Spacing [SZSP], is a field used to specify the spacing between system zones. System Zone Size [SZSZ] is a parameter that defines the size of a system zone in a volume of tape. The SZSP and SZSZ fields are applicable only when a System Zone Option is chosen. The System Zone Option is a parameter that provides a choice given to the host computer system allowing the host to choose to use multiple system zones. If the System Zone Option is not chosen, the related fields are set to zero.

Still another parameter, the Last Doubleframe Number [LDFN], is a field used to define the Physical End of Media [PEOM] of a tape volume. A doubleframe is the minimum recordable physical block entry of which the peripheral recording device is capable. There are multiple types of doubleframes. Normally, it will point to the doubleframe that is close to but not less than 1,000 millimeters from the physical end of the tape. The LDFN may be set to any value prior to 1,000 millimeters of the physical end of the tape. Any doubleframes after the one indicated by LDFN are considered invalid.

The Last Valid Partition [LVPT] is a parameter used to identify the last valid partition on a tape volume. For a single partition tape, the LVPT is set to zero. For a multi-partition tape, the LVPT is the partition identification number of the last partition on the tape volume. Any partition with a partition identification number larger than the LVPT is considered an invalid partition.

The Last Valid System Zone [LVSZ] is a parameter that identifies the last valid system zone on a tape volume. The last valid system zone shall be the system zone that is closest to the physical end of media. When the System Zone Option is not enabled, the LVSZ is set to zero.

The partition group parameters provided in the VFI are used to describe tape volumes containing up to two types of partition groups, A and B. Partition Group A Count [PGAC] and Partition Group A Size [PGAS] define the number of partitions and the size of the partitions in Group A. Partition Group B Count [PGBC] and Partition Group B Size [PGBS] define similar parameters for partition Group B. Partition Group A Physical Block DF Type [PGAPD] and Partition Group B Physical Block DF Type [PGBPD] are fields describing the type of physical block doubleframes to be used in the tape volume for partition Groups A and B, respectively.

For a nonpreformatted tape, PGAS shall be set to all "1's" to indicate the size is unknown. For a preformatted single partition tape volume, the PGAS is either zero or a value that provides the exact doubleframe count in the partition. If the PGAS is set to zero, this indicates that the entire information storage area shall be used by a single partition.

If a multiple partition volume is using only a single partition group format, the partition group shall be described by the partition Group A parameters and all the partition Group B parameters shall be set to zero. For a two partition group format, partitions of Group A are laid down first followed by partitions of Group B. This same sequence repeats until either the capacity of the information zone is exhausted or the expected last valid partition is reached, whichever occurs first. A special case arises when PGBC is set to one and PGBS is set to zero. In this case, after laying down the first partition Group A, the remaining capacity of the tape shall belong to the single partition of Group B.

Finally, the Partition Layout Option [PTLO] is a parameter defining the method to be used for the placement of partitions when the partitions are placed across a system zone as described in application Ser. No. 07/843,390 filed Feb. 28, 1992 (attorney docket No. 26945-443). The PTLO is applicable for laying down all but the first partition of the tape volume.

The VFI zone also contains the Volume Format Table [VFT]. The VFT is a table that contains a series of entries relating to the nonoverlapping but contiguous sections on the table. The table allows a peripheral recording device to find any sections on the tape volume when variable length partitions are used. The table is generated from the VFI parameters with a Volume Format Information algorithm. The table consists of three parts.

Referring to FIG. 3, there is shown a diagram of a volume format table. The first section 7 of the table is the number of Valid Table Entries [NVTE] field containing a count of the number of valid entries stored in the volume format table. The second section 9 of the table contains up to 1125 eight byte entries indicating the location and type of each subsection within the tape volume format. Any unused entry spaces within the second section of the table will be filled with zero. The third Section 11 of the table is a check sum for all of the bytes in the table.

Using this table, a tape volume may be divided into 1,124 nonoverlapping but continuous tape sections. For each tape section, there will be one corresponding section entry in the table. The order of section entries in the table is in the same sequence in which the tape sections are located on the magnetic tape media. As an example, the first section entry for the first VFI zone shall always be the first entry of the table and the table shall always end with an end-of-volume entry following the last valid section entry. The end-of-volume entry is also considered as a table entry and shall be included in the count of the NVTE field. Each section entry is used to define the type of tape section, its starting location, the physical data block type comprising the tape section and the associated identifier corresponding to the tape section.

At the same time the system zones are being formatted, the magnetic tape is also being formatted with a plurality of partitions. This process is initiated by a prompt from the controller of the peripheral recording device to the host computer system requesting the number of partitions and the length of the partitions to be formatted onto the tape. The controller also instructs the peripheral recording device to request the host computer system to choose a partition formatting option. The controller then formats partitions onto the tape in accordance with the responses received from the host computer system. The first partition is formatted starting at the Physical Beginning of Medium (PBOM) and may be immediately followed by the next partition or a system zone.

Figure 4:
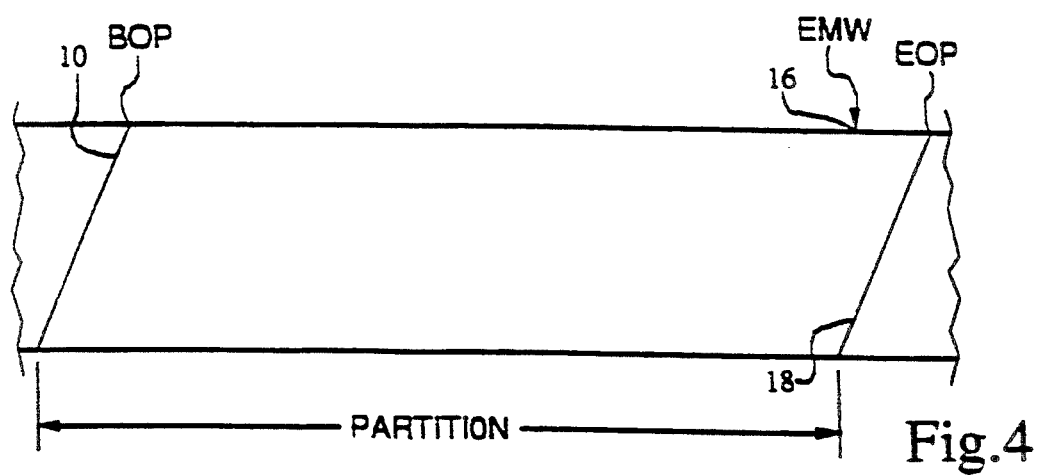
FIG. 4 is a diagram of the format of a partition on a magnetic tape.

Referring to FIG. 4, there is shown the general format of a partition. The beginning of partition (BOP) 10 is a location on the tape that denotes the physical beginning of a partition. The BOP 10 is not an actual recording area on the tape but indicates the first track of the beginning of the partition.

The end of media warning (EMW) 16 is a recording area that contains a warning recording to be sent to the peripheral recording device when there is an attempt to record data in the area. This notifies the recording device that available recording area on the partition is about the end.

The end of partition (EOP) 18 is a location on the tape denoting the physical end of a partition. There is no recorded or physical marking of EOP 18 on a tape. The data track after the last data track of a partition is considered the EOP 18. Therefore, if two partitions are physically adjacent, the BOP 10 of the second partition also denotes the EOP 18 of the previous partition.

Although preferred embodiments of the invention have been illustrated in the accompanying drawings and described in the foregoing Detailed Description, it will be understood that the invention is not limited to the embodiments disclosed, but is capable of numerous rearrangements and modifications of parts and elements without departing from the spirit of the invention.

We claim:

1. A method for formatting a magnetic tape comprising the steps of:

identifying a tape volume format for the magnetic tape;

formatting a plurality of spaced apart system zones along the length of the magnetic tape in accordance with the tape volume format; and storing information on the tape volume format within each of the plurality of system zones to allow for retrieval of tape volume format information at a plurality of locations along the length of the magnetic tape.

2. The method of claim 1, wherein the step of storing information includes the steps of:

generating volume format parameters providing information on the tape volume format;

generating a volume format table from the volume format parameters; and storing the generated volume format parameters and volume format table within each of the plurality of system zones.

3. A tape media comprising a plurality of spaced apart system zones formatted thereon at intervals along the tape media in accordance with a tape volume format, and a plurality of user data zones reserved for recording user data between the system zones; each system zone including an information zone for storing volume format parameters for the tape volume format for the length of tape media and a table generated from the volume format parameters defining the tape volume format for enabling a tape controller to locate user data written onto the tape media in the user data zones from any one of the plurality of spaced apart system zones.

4. The tape of claim 3, wherein the volume format parameters comprise;

a parameter indicating the size of each system zone;

a parameter indicating the interval between system zones; and a parameter indicating the last valid system zone on the tape.

5. The tape of claim 4 wherein the volume format parameters further comprise a parameter identifying the tape volume.

6. The tape of claim 3, wherein the volume format parameters include partition group parameters defining one or more partition types on the tape, the partition group parameters for each partition type further comprise:

a parameter describing the size of a partition;

a parameter describing the partition type;

a parameter indicating a last valid partition on the tape;

a parameter indicating the formatting of a partition extending across a system zone; and a parameter identifying types of physical blocks comprising the partition.

7. The tape of claim 3, wherein the table defining the tape volume format comprises:

a storage location for storing data indicating the number of tape section entries on the tape;

a storage location for storing a plurality of entries identifying each tape section, identifying the location of each tape section on the tape, identifying the data block type of the tape section, and identifying the type of tape section at the location on the tape; and a storage location for storing a check sum value of the table.

8. The tape of claim 3 wherein each system zone further comprises a mechanical operations zone for enabling mechanical operations on the tape at any one of the plurality of system zones.

* * * * *